United States Patent
Bonadeo et al.

(10) Patent No.: US 8,682,465 B2
(45) Date of Patent: *Mar. 25, 2014

(54) MEASUREMENT METHOD AND DEVICE FOR THREAD PARAMETERS

(75) Inventors: Nicolás Hernán Bonadeo, Buenos Aires (AR); Sebastián Berra, Buenos Aires (AR); Javier Ignacio Etcheverry, Buenos Aires (AR)

(73) Assignee: Tenaris Connections Limited, Kingstown (VC)

( * ) Notice: Subject to any disclaimer, the term of this patent is extended or adjusted under 35 U.S.C. 154(b) by 240 days.

This patent is subject to a terminal disclaimer.

(21) Appl. No.: 13/131,851

(22) PCT Filed: Dec. 3, 2009

(86) PCT No.: PCT/EP2009/066309
§ 371 (c)(1),
(2), (4) Date: May 27, 2011

(87) PCT Pub. No.: WO2010/063792
PCT Pub. Date: Jun. 10, 2010

(65) Prior Publication Data
US 2011/0238199 A1    Sep. 29, 2011

(30) Foreign Application Priority Data
Dec. 5, 2008  (EP) .................... 08170841

(51) Int. Cl.
*G06F 19/00* (2011.01)
*G01B 5/08* (2006.01)
*G01B 7/12* (2006.01)
*G01B 11/08* (2006.01)
*G01B 13/08* (2006.01)
*G01B 21/10* (2006.01)
*G01B 11/24* (2006.01)
*G06K 9/00* (2006.01)

(52) U.S. Cl.
USPC ............ 700/109; 702/157; 356/608; 382/152

(58) Field of Classification Search
USPC ................. 700/109; 702/150, 152, 155, 157; 356/601, 608; 382/152
See application file for complete search history.

(56) References Cited

U.S. PATENT DOCUMENTS

| | | | |
|---|---|---|---|
| 3,489,437 A | | 1/1970 | Duret |
| 4,644,394 A | | 2/1987 | Reeves |
| 5,136,157 A | * | 8/1992 | Apter et al. ............... 250/223 B |
| 5,137,310 A | | 8/1992 | Noel et al. |
| 5,260,780 A | | 11/1993 | Staudt, III |
| 5,521,707 A | | 5/1996 | Castore |
| 5,712,706 A | | 1/1998 | Castore et al. |
| 5,871,391 A | * | 2/1999 | Pryor ................................ 451/9 |
| 7,310,890 B2 | | 12/2007 | Cattaneo et al. |
| 2005/0134838 A1 | * | 6/2005 | Hartmann et al. ......... 356/237.1 |
| 2008/0158905 A1 | * | 7/2008 | Chuang et al. ................ 362/581 |
| 2009/0033087 A1 | | 2/2009 | Carcagno et al. |
| 2010/0110448 A1 | | 5/2010 | Johnson |
| 2011/0084483 A1 | | 4/2011 | Nunez |
| 2011/0238199 A1 | | 9/2011 | Bonadeo |
| 2011/0293169 A1 | | 12/2011 | Bonadeo |
| 2011/0295550 A1 | | 12/2011 | Bonadeo |

FOREIGN PATENT DOCUMENTS

| | | |
|---|---|---|
| GB | 1 398 214 | 6/1973 |
| GB | 1 428 433 | 3/1976 |
| WO | WO 2004/033951 | 4/2004 |
| WO | WO 2007/063079 | 6/2007 |
| WO | WO 2008/090411 | 7/2008 |
| WO | WO 2010/063792 | 6/2010 |

OTHER PUBLICATIONS

Written Opinion in corresponding International Application No. PCT/EP2009/066309, mailed Feb. 9, 2010.
International Preliminary Report on Patentability in corresponding International Application No. PCT/EP2009/066309, issued Jun. 7, 2011.
Machine Design, "Lasers Gauge Pitch", Machine Design, Penton Media, USA, vol. 67, No. 19, p. 40, Oct. 26, 1995.
International Search Report mailed on Feb. 9, 2010 in PCT Application No. PCT/EP/2009/066309.

Albion Devices, Inc., "Why Compensate for Temperature?" Albion Devices, Inc., Feb. 2004.

* cited by examiner

*Primary Examiner* — Crystal J Barnes-Bullock
(74) *Attorney, Agent, or Firm* — Knobbe, Martens, Olson & Bear, LLP

(57) ABSTRACT

A measurement method for thread parameters for a threaded object (3), by means of a measurement device (1) defining a spatial reference system (X, Y, Z) incorporating an optical sensor (5) to retrieve the shape of the threaded object, and defining a spatial reference system (X', Y', Z'), the measurement device (1) having a computer to assemble a first matrix that describes the quadratic form representing the threaded object in the spatial reference system (X, Y, Z), thus providing the relationship between the two spatial reference systems. The method comprises the steps of: a) predefining at least one trajectory of the at least one optical sensor (5) on the threaded object, along which measurement points are selected such that the matrix evaluated on these values satisfies the condition that it has maximum rank, b) performing a first scanning operation by the at least one optical sensor (5) along said at least one trajectory and retrieving data of the predefined measurement points, c) feeding these data to the first matrix and calculating an axes transformation matrix relating the first spatial reference system with the second spatial reference system for defining the relative position of the threaded object with respect to the second spatial reference system, d) using the axes transformation matrix to convert all data retrieved from the second spatial reference system to the first spatial reference system.

20 Claims, 10 Drawing Sheets

MEASUREMENT METHOD AND DEVICE FOR THREAD PARAMETERS

CROSS-REFERENCE TO RELATED APPLICATIONS

This application is a U.S. National Phase of PCT International Application No. PCT/EP2009/066309, filed Dec. 3, 2009, and published as WO 2010/063792 on Jun. 10, 2010, which claims priority to European Application No. 08170841.4, filed Dec. 5, 2008. The disclosure of both prior applications is incorporated by reference in their entirety and should be considered a part of this specification.

FIELD OF THE INVENTION

The present invention relates to a measurement method for threading, especially suited for threaded pipes used in the hydrocarbon industry and for similar threaded objects.

BACKGROUND OF THE INVENTION

In a thread manufacturing process such as that of a screw, bolt or of a threaded pipe it is necessary to verify that the geometrical dimensions of the piece comply with the tolerances set for the product. In addition, knowledge of the nature of the deviation from these tolerances can be used for feedback to the manufacturing process, so avoiding rejects later on in the process.

A main problem in performing the measurement operations for quality control is the precision and repeatability of measurements. In the past there have been attempts to improve accuracy and repeatability of the measurement operations and to make measurement systems capable of measuring the thread shape of complex mechanical objects like the threading of pipes used in the oil industry. In this particular technical field there is the need to measure several parameters like taper of pin and box, thread pitch, thread height, pin or box diameter, pipe ovality, run in and run out.

For instance document U.S. Pat. No. 5,712,706 discloses a non-contact laser-based sensor guided by a precision mechanical system which scans a thread profile and produces a set of computer images of the threading. The computer images are then analyzed to acquire quantitative information about thread characteristics such as pitch, lead, root radius, flank angle, surface roughness, helix variation, and pitch diameter. That document however has the disadvantage that it does not address explicitly the important problem of piece misalignment and therefore it requires an absolute precision of the operations when aligning the piece to be measured with the mechanical system coordinates. This alignment can only be achieved when the piece is at the threading machine. Measuring at the threading machine has several disadvantages; it adds costly time to the threading process by preventing the inspection and manufacturing process from running in parallel, it requires placing delicate optics and precise mechanical components in a hostile environment with cutting oil and strong vibrations present, and to some extent uses the same mechanical movement that has to be verified. Once the piece has been removed from the lathe, this alignment is very difficult to achieve manually and consequently the system disclosed by that document only allows measurement of relative or local magnitudes, i.e. thread height by comparing contiguous crests and roots, whereas errors introduced by a piece misalignment are not "noticed" by that solution and in these cases they produce an insufficiently precise measurement. It also does not address the measurement of important thread parameters such as taper, run-in, run-out, black crest, length of complete thread or specific process parameters such as taper profile, pitch linearity, Fourier mode decomposition of ovality, lathe plate misalignment, hook end angle severity to name just a few.

The need is felt to solve the problem of overcoming misalignment between the measurement device and the threaded piece to be measured in a repeatable, satisfactory and sufficiently precise manner.

SUMMARY OF THE INVENTION

It is therefore an object of the present invention to provide a measurement method which overcomes the aforementioned drawbacks and limitations.

A main object of the present invention is to provide a method for accurate, automatically performed, non-contact inspection of threaded objects, in particular of oil pipe threads, especially of pins and boxes.

The above mentioned objects and others which will become apparent in view of the following description, are achieved according to the present invention, by means of a measurement method for thread parameters, in particular for a threaded object, wherein a measurement device is provided incorporating at least one optical sensor adapted to retrieve the shape of the threaded object, having a nose and defining a first spatial reference system comprising first co-ordinate axes, the measurement device defining a second spatial reference system comprising second co-ordinate axes, providing computer means for storing a preset algorithm to calculate a first matrix that describes the quadratic form representing the threaded object in the second spatial reference system, thus providing the relationship between the first and second spatial reference systems, the method comprising the steps of:

a) predefining at least one trajectory of the at least one optical sensor on the threaded object, along which measurement points are selected such that the matrix evaluated on these values has maximum rank, b) performing a first scanning operation by the at least one optical sensor along said at least one trajectory and retrieving data of the predefined measurement points, c) feeding these data to the preset algorithm and calculating an axes transformation matrix relating the first spatial reference system to the second spatial reference system for defining the relative position of the threaded object with respect to the second spatial reference system, d) using the axes transformation matrix to convert all data retrieved from the second spatial reference system to the first spatial reference system.

In this description we refer to trajectory as the path the sensor follows through space, describing a sequence of values of the surface location with respect to the sensor.

The method according to the invention achieves several advantages:

it allows acquisition of quantitative information about thread characteristics, e.g. taper, seal diameter and ovality, run-in, run-out, thread diameter and ovality, pitch along a plurality of generatrices of the tube, and step height, it allows absolute measurements to be performed on several threading parameters and tube features regardless of any misalignment between the threaded tube and the measurement apparatus, detrimental contact between the object to be measured and the measurement apparatus is avoided thanks to the use of non-contact sensors, like laser sensors or other optical sensors, the object to be measured is precisely located in space by means of the series of scanning and fitting steps performed, regardless of its position and alignment with respect to the measurement device.

In order to implement the method of the invention, according to a second aspect of the invention, there is provided a measurement device comprising:

A measurement device, comprising:
at least one computer controlled non-contact laser-based sensor, mounted on a precision mechanical moving system,
a computer controlled precision mechanical moving system able to guide said at least one sensor during operations according to the various scanning patterns,
a means to synchronize output signals of the at least one sensor with spatial positions of the mechanical system,
a computer to control the at least one sensor in the various scanning operations, to produce computer images of the thread shape of the scanned object, to store the images and to analyze the computer images to obtain quantitative information about thread characteristics like taper, seal diameter and ovality, run-in, run-out, thread diameter and ovality, pitch along multiple generatrices of the tube, and step height.

BRIEF DESCRIPTION OF THE FIGURES

The present invention will be now described according to a preferred embodiment thereof, which is given by way of non-limiting example, by means of the accompanying figures where.

DETAILED DESCRIPTION OF PREFERRED EMBODIMENTS OF THE INVENTION

Figure 1:
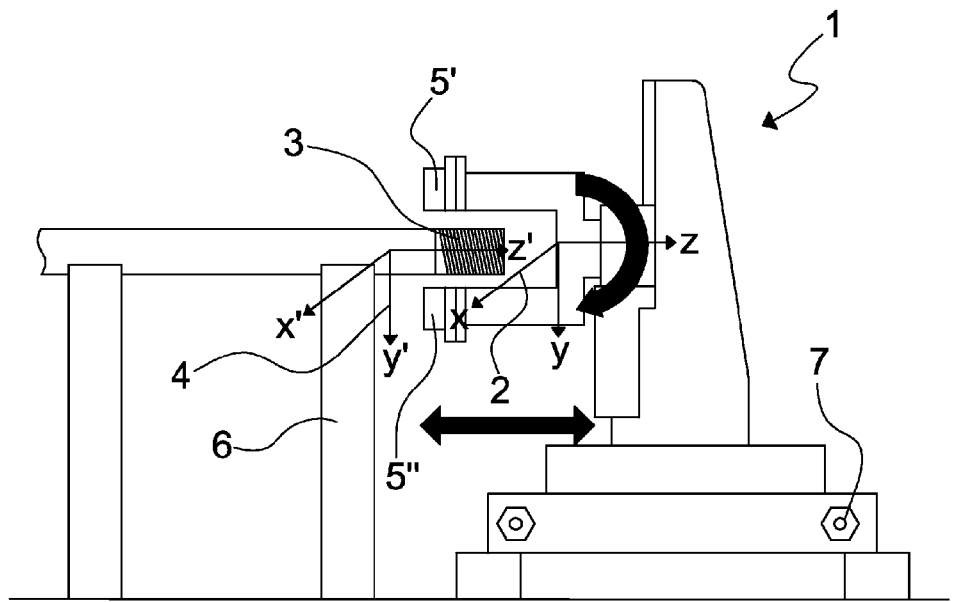
FIG. 1 shows a schematic axonometric view of a measurement device for implementing the method according to the invention.
Figure 1A:
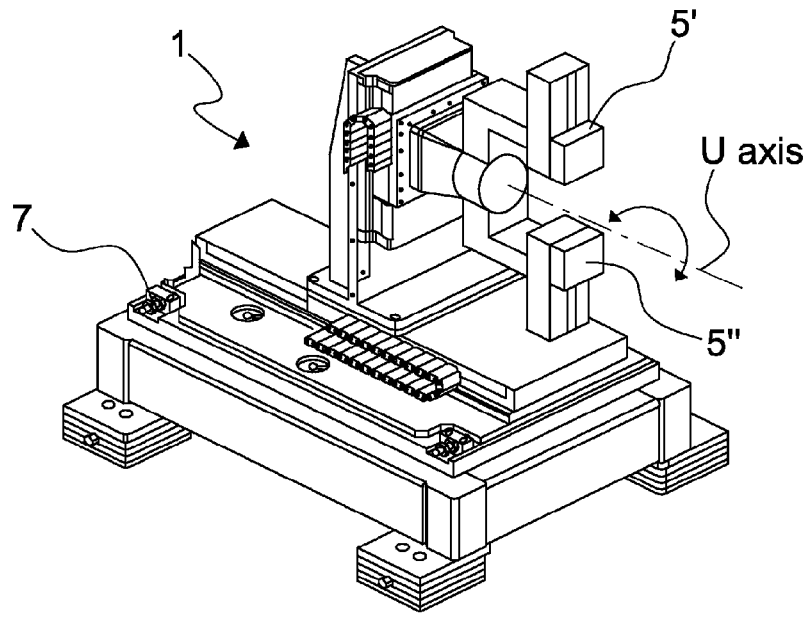
FIG. 1a shows a perspective view of a measurement device in accordance with the invention.

With particular reference to the FIGS. 1 and 1a, there is shown a scheme of an automatic thread inspection optical system based on laser displacement sensors, called in short hereafter "measurement" device 1, which has its own Cartesian reference system 2, defined by the orthogonal axes X, Y, Z. A threaded portion of a pin 3 to be measured is shown on the left of the figure. This pin has its own Cartesian reference system 4 defined by the orthogonal axes X', Y', Z'. In the FIG. 1 the pin is positioned far from the measurement device in a rest position on a bench 6.

In the following description of the invention, for the sake of simplicity, reference is made to a pin of an oil or gas pipe, however it is understood that the invention can have an application also for any other similar threaded objects, like screws or similar objects. When initial installation of the device is performed, a pin 3 is mounted on the measurement device 1 to perform the measurement operations according to the invention, the respective pin and measurement device 1 reference systems are placed as close as technically possible one to each other using the horizontal and vertical angular and lateral displacement movements provided by the device (see FIG. 1). Nevertheless, despite all possible care, the two reference systems will not coincide exactly and small misalignments, both in the angular and in the lateral position of the reference system 2 of the pipe, with respect to the measurement device may still exist. Even more, when another pin 3 is positioned, its angular and lateral position will differ from the previous pin due to placement error and geometrical differences (such as hook end) between the pieces. Due to these reasons, it is generally the case that under operative conditions the misalignment of pins, or more generally of the threaded parts of pipes, with respect to the measurement device, is of the order of millimeters in the linear displacement and in the order of a degree in the angular displacement. Only by means of adjusting the position of every pin a smaller misalignment value could be achieved, however, that scenario is impractical in reality. The invention achieves the objective of the device working without any lateral or vertical adjustment of the knobs 7, shown in FIGS. 1 and 1a, after the initial installation. The measurement device 1 comprises two laser displacement sensors 5' and 5" mounted on a yoke piece advantageously machined from a single aluminium piece to minimize mechanical movements. This piece or head is mounted on a rotational stage, able to pivot about a U-axis, and belongs to the head of the measurement device, together with the laser sensors 5' and 5". Each sensor 5', 5" is mounted on an X stage that can be moved in the radial direction (X axis), by means of linear rotary motors. Angular and linear movement of these stages parallel to the Y axis, orthogonal to the X axis, allows the stage to be aligned along the same line. Both laser sensors 5' and 5" can also be adjusted by lateral and angular displacement to align the center of the laser emission with respect to the center of rotation of the device.

The stage X in addition can be motorized so that it can be used for an automatic change of product diameter while maintaining the sensors always within their range. Finally, there is provided a linear stage, (moving along the Z axis) that allows displacing the head parallel to the device axis Z.

The linear stage, movable along the Z axis, is mounted on a base that is hardcoated on the bottom to allow smooth displacement with respect to the base when the device is set up for the first time, FIG. 1a. Four knobs, e.g. placed one on each corner, allow for horizontal angular and lateral displacement in a plane. There are provided screws, or equivalent means, to fix the whole structure to avoid movement once the initial alignment has been accomplished. There is provided advantageously a wedged pad on each of the four legs to regulate height and out-of-plane angular alignment.

All these regulation possibilities make for easy initial installation of the device in a plant, allowing for small corrections to levelling tolerances, to conveyer alignment and to imperfections in the levelling of the plant floor.

The manner in which this measurement device is used to perform measurements on threaded objects is described hereafter. After the initial installation is carried out, as described above, a typical measurement operation comprises two main steps: data acquisition and data analysis.

We will start by describing the data acquisition procedure. During this procedure the laser sensor output signals and positions of servos are stored in a synchronized manner ensured by the use of hardware signals to enable windows and counters. Below, a description is given of the signals used.

Figure 2:
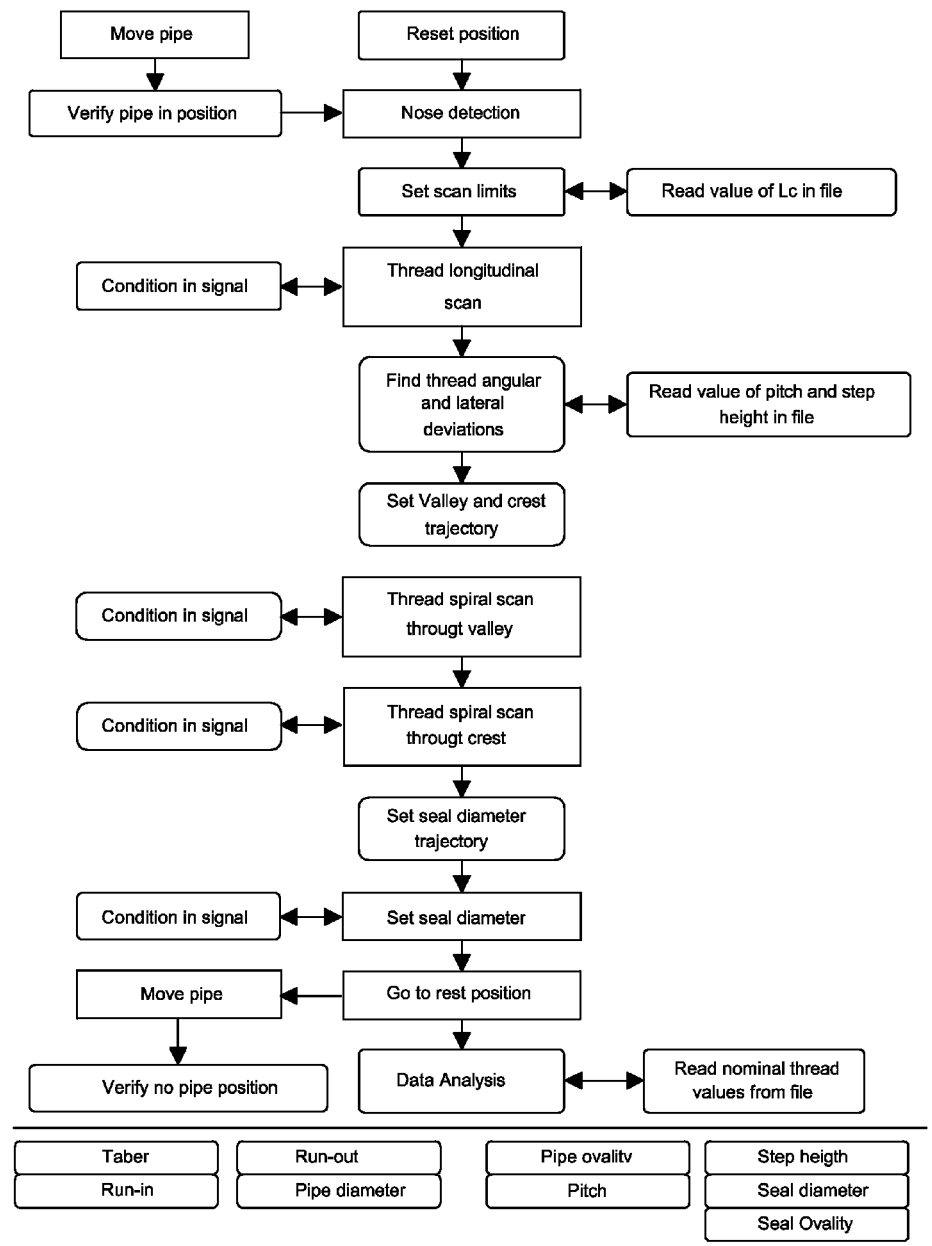
FIG. 2 is a flow chart showing the scheme of the measurement method of the invention.

FIG. 2 shows, by means of a flowchart, the general working scheme of the data acquisition procedure governing the whole measurement process once the initial calibration and plant installation has been performed. It starts by verifying that the pipe is in position aligned to the measurement device, then the measurement device executes a first longitudinal scanning operation along the threaded portion of the pipe to find the relative position of the pipe nose with respect to the frame of reference of the measurement device. After the relative position of the nose is detected, all distances reported during measurement are referred to that point. If the measurement operation of the threaded pipe provides for only one scanning operation, the data are gathered only in correspondence with points belonging to the path followed by the sensors 5' and 5". This is generally done because the data collected are considered sufficient to the needs of the users.

If the measurement procedure on the threaded object provides for several scanning operations along several trajectories on the surface of the threaded portion, data are also collected on predefined points along these trajectories. The choice of the measurement points where data are gathered is made in such a manner that a matrix that describes the quadratic form has maximum rank when values corresponding to these points are inserted in it.

In a preferred embodiment of the method according to the invention, a plurality of longitudinal profiles, e.g. six, are scanned at equally spaced angular steps. Data gathered by means of these scans are processed to remove spurious peaks and pass encoder counts to physical units and are then used to calculate a first estimation of the thread angular misalignment with respect to the measurement device frame of reference and reassign the nose position by averaging the six nose positions corresponding to the six scans.

These scanning operations are also used to detect the positions of the crests and roots of the threads and define a spiral trajectory table, by interpolating this information, so as to allow successive scanning operations over the center of the crests or roots of the thread. Data acquired by means of those spiral scanning operations are also conditioned and used to measure more precisely the misalignment in respect of the thread frame of reference. After this operation, and having detected the orientation of the thread, a table for the seal or seals, run in and run out trajectories, can be constructed in the reference frame of the piece (X',Y',Z') and transformed to the device coordinate system and executed.

After the end of the scanning operations, the head of the measurement device returns to its rest position and data analysis begins in order to obtain all the parameters of the thread under test.

The procedure described before in broad terms is hereafter described in detail by splitting it into several steps and indicating various embodiments of the measurement method of the invention for calculating a series of specific parameters of the threading.

Figure 3:
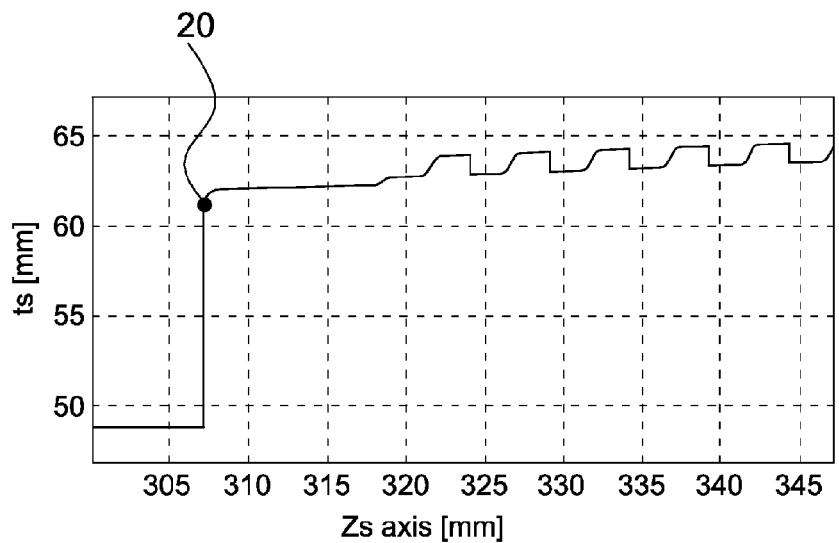
FIG. 3 is a graph showing results of a step in the data acquisition procedure.

The first step of the data acquisition is nose detection, which consists in executing a linear scan along the Z-axis between two reference distances where the nose is estimated to be located. It will be appreciated that this linear scan can be the only scanning operation predefined in the measurement method, or it can also be the first scanning operation of a plurality of scanning operations. The signals provided by the laser sensors 5 are further analysed by making a check of the presence or absence of Out Of Range (OOR) values. An OOR value consists of a non-valid point (i.e. out of the physical range of the sensor), as sent by a sensor when no object is found in the measurement range of the sensors. These signals are processed by defining a sampling window of e.g. fifty data points and verifying that all samples are not OOR. The sampling window is then moved one step further and the values of the signals sent are checked again until all samples in that window are recognised as valid data points after processing. The first sample of that block is defined as the nose position of the pin. The graph of FIG. 3 shows the results produced by a scan during nose detection. It shows OOR values previous to the encounter of the laser sensors with the pipe nose, the dot 20 indicating the position, with respect to the Z axis, where the nose has been detected. After this point has been detected, scanning is stopped, and the following step of the data acquisition procedure is started.

An accurate determination of the nose position is not necessary for measuring most of the thread parameters of interest that are based on relative distance measurements, except in the case when it is necessary to measure pipe and seal diameters. These parameters are measured at a precise distance relative to the nose position because the thread taper changes the values if measured elsewhere.

Figure 3A:
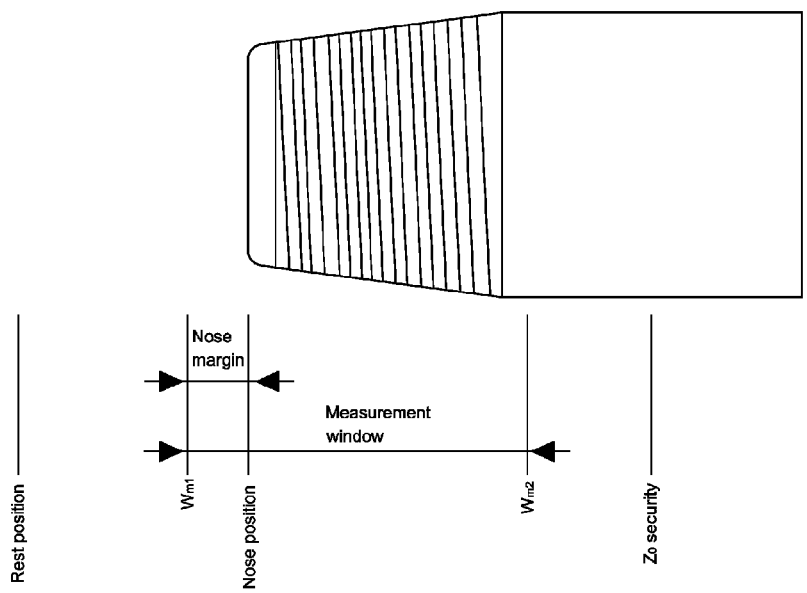
FIG. 3a shows a detail of a threaded object on which the measurement method of the invention is performed.

After the position of the nose has been determined, in those cases where this detection is necessary, several longitudinal scanning operations, e.g. three (but a greater or smaller number are possible), are performed along the Z-axis direction by acquiring outputs at the same time from both laser sensors 5', 5". A definition of the limits of the scanning range window is represented generically in FIG. 3a. From its resting position, the head of the measurement device is driven back to the first position of the measurement window indicated by Wm1, corresponding to the nose position, which is at the end of the nose margin.

When the sensors are placed in position Wm1, a movement towards security point $Z_0$ is indicated and the window signal that resets encoder counts is enabled. The number of encoder counts to be acquired by the laser sensors is preset to fit into the measurement window longitude. When this preset number is reached, the head of the measurement device is commanded to stop at the point indicated by Wm2. In this manner, the measurements from the laser sensors 5', 5" together with encoder counts are acquired in the measurement window segment. Longitudinal scans are subsequently implemented in the inverse direction. Similar limits for encoder counts to be acquired by the laser sensors are set also for these movements in the opposite direction. This movement in the reverse direction towards the rest position starts from point Wm2 and ends in point Wm1, where it stops after having reached the predetermined encoder counts to fit the measurement window.

Figure 6:
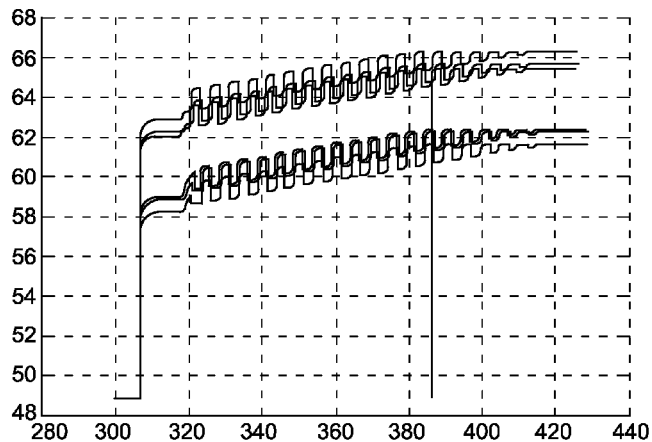
FIG. 6 is a graph showing results of further steps in the data acquisition procedure, FIG. 7 are graphs showing hypothetical assignations of load flanks, FIG. 8 are graphs showing results of spiral scans, FIG. 9 are graphs showing results of seal scans.

FIG. 6 shows a typical longitudinal scan where signals generated by both laser sensors 5', 5", placed at an angular distance of 180° apart, are acquired. In this example the three scans result in six profiles, i.e. two groups of three profiles, each corresponding to one of the laser sensors 5' and 5", of the thread under test, and are useful for giving a first estimation of the thread misalignment.

The quantity of scans, given here by way of example, can also be more or less than three, depending on the object to be measured and depending on the parameters that are sought. In these particular cases, pitch and step height along six generatrices are the parameters sought.

Another variant of the measurement method provides for a data acquisition operation consisting of detecting selected points on thread crests and roots made by performing a number of longitudinal scans parallel to the Z axis. Data collected from these scans also enable points to be determined on thread roots and crests that are used for the definition of trajectories along which two subsequent spiral scanning operations are performed, one along the thread crest and the other one along the thread root. By being generated previously in this manner, the trajectory avoids falling off the crest or climbing out of the root during the scanning operation when the object is misaligned with respect to the X', Y', Z' co-ordinate system.

The first step of this measurement operation starts by detecting thread load flanks, consisting of detecting load flanks for each longitudinal profile. This is performed by differentiating the whole data vector and evaluating values that override a preset threshold. A vector containing all zero values is generated, excluding those detected points which are candidates for indicating the presence of a load flank. Another vector is generated which represents a theoretical comb with teeth of a specific detection width and nominal pitch separation between the teeth. These two vectors are cross correlated in order to find the relative position between the comb and the load flank 21 candidate vector that maximizes the cross correlation (see FIG. 5). The cross correlation consists of performing a scalar multiplication of the two vectors and finding the sum of the resulting vector while changing their relative vector index.

Subsequently load flanks 21 are assigned in correspondence with the points found as candidates for each comb tooth according to the following criteria:
  If one candidate flank is present (which is defined as type 0): this flank is a real load flank.
  If no candidate flank is present (type 1): a flank is created just in the middle of the thread comb interval for the purpose of producing the spiral trajectory.
  If more than one candidate flank is present (type 2): there are spurious flanks in the thread comb, so the nearest to the middle point of the thread comb interval is determined as the real load flank. The remaining ones are dismissed.
  If an out of range is found in the interval (type 3): the flank is discarded and a virtual flank is created for the purpose of producing the spiral trajectory.

Figure 7:
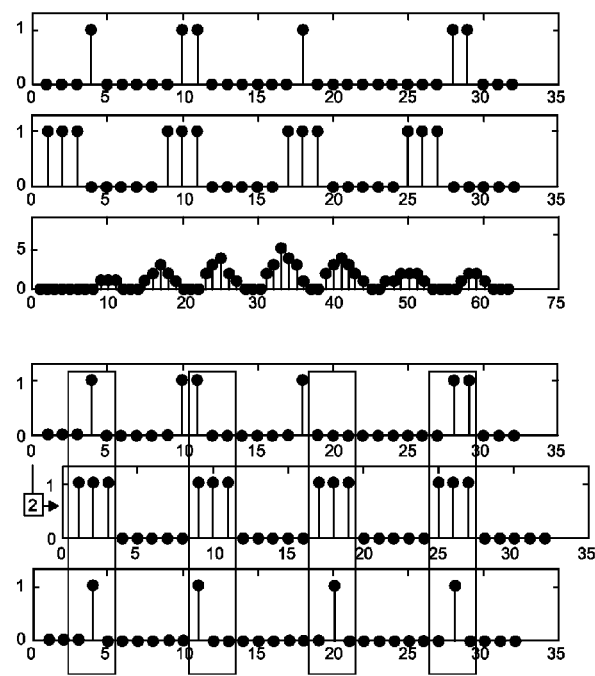

FIG. 7 shows hypothetical load flank candidates and comb vectors in the three mentioned cases possible for assigning loading flanks.

Figure 5:
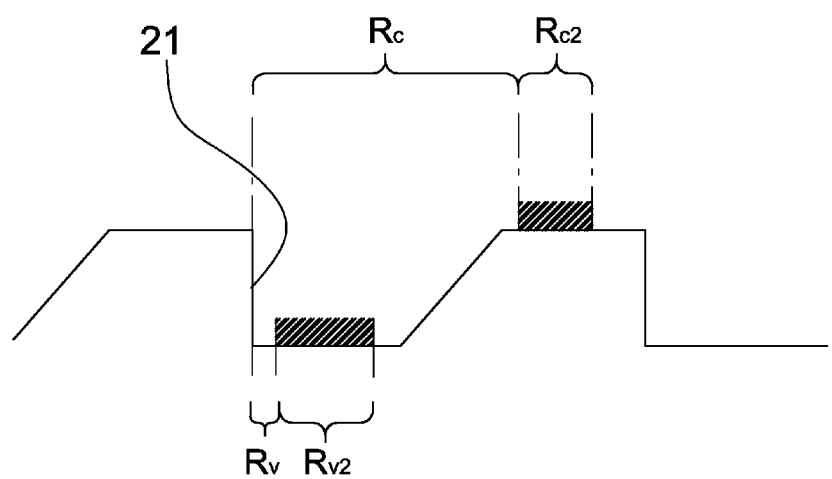
FIG. 5 shows a scheme of a thread longitudinal section where measurements are made.

Another variant of the measurement method provides for assigning points along crests and roots, wherein the crests and roots segments are defined following the thread mechanical drawings with the parameters Rc, Rc2, Rv and Rv2 as shown in FIG. 5 .

Each segment is conditioned by filtering OOR and possible peaks taking into consideration that the segment should be a line. Then, the point corresponding to either root or crest is calculated as the mid segment point.

FIG. 7 shows a longitudinal scan where those points detected as being root and crest points are indicated. Graph (a) shows the candidates for load flanks, graph (b) shows the theoretical comb, graph (c) shows the cross-correlation, graph (d) shows candidates for load flanks, graph (e) shows the displaced theoretical comb, graph (f) shows assigned load flanks. As can be seen in this Figure, points are generated by extrapolating the determined points in the threaded portion for location prior to the nose position, and after the end of the thread where the non-machined part of the pipe starts. This is done to smoothly enter and emerge from the threaded portion during execution of the spiral scan, to obtain the phase of the thread relative to the measuring device frame of reference, to estimate the position of the black crest, to calculate the lathe eccentricity axis, and to measure the pipe hook end.

All the root points determined in each longitudinal scanning operation are also used for fitting a quadric surface representing the cone of the thread being analysed so as to gather a first estimation of the thread angular misalignment with respect to the measurement device reference frame. Crest points are preferably not used in this calculation for two main reasons:
a) the determination of these points is more inaccurate than that of root points, (i.e. the portion of the pin where determination of the roots is performed is longer) and
b) the number of root points over the thread surface cone is higher than that of the crest points due to the presence of "black threads" generated in the manufacturing process.

The generic matricial form of the quadric surface is described in formula [1].

$$\bar{x}^t . A . \bar{x} + \bar{b} . \bar{x} = 1 \qquad [1]$$

where $\bar{x} = [x, y, z]^t$ is a point of the quadric in the 3D space, A is a symmetric matrix related to the quadric (it is formed by nine parameters, three for translation, three for orientation and three for the quadric form as expressed in a canonic frame) and $\bar{b}$ is the quadric displacement vector.

The selected data is fitted to the expression shown in [1] by using a least squares approximation, from which the parameters of the quadric (e.g. the parameters that conform to A and $\bar{b}$) are obtained.

These data are useful for the conformation of a linear transformation and its inverse transformation between the measurement device and thread reference frames.

Figure 4:
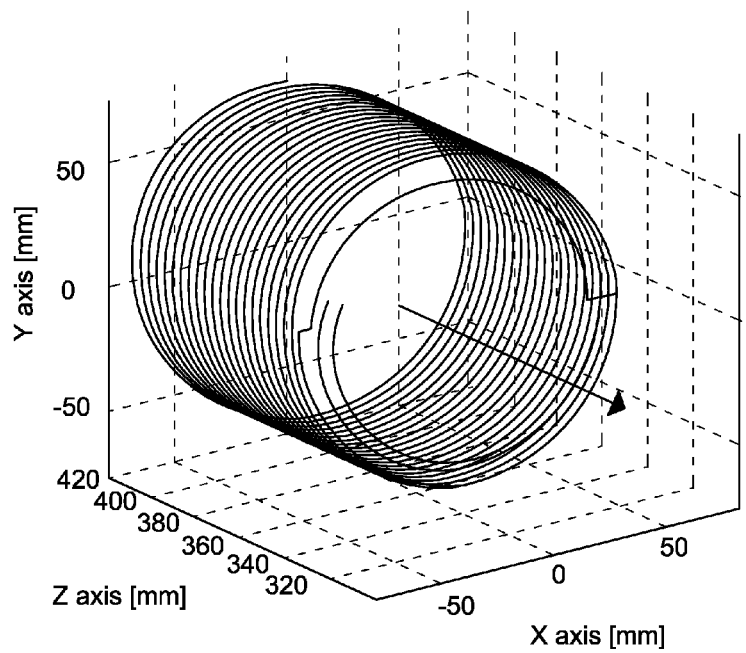
FIG. 4 is a graph showing a further step in the data detection procedure.

The subsequent operation consists of spiral scannings (such as illustrated in FIG. 4), both along root and crest of threads. The information acquired before relating to the root and crest mid point positions, for each longitudinal scan, is interpolated and used to build two spiral scanning tables. All of the root mid points are transformed to the thread coordinate frame. Afterwards, a linear fit is performed over the data resulting from a t vs. Z arrangement. Subsequently, a new set of points is generated segmenting the fitted line with a regular step. These points are transformed back to the measurement device reference frame and passed to a controller for the calculation of the servo references. The same procedure is applied on the crest mid points for generating the crest scanning table.

Preferably, the root scan is executed starting from the nose while the crest scanning is executed in the opposite direction, considering the Z-axis. FIG. 5 shows a typical root and crest scanning expressed in respect of the measurement device reference frame. Data obtained from the root spiral scan are used to calculate a better estimation of the measurement device to thread misalignment that is also used to recalculate the transformations between reference frames that are applied in the data analysis.

Figure 8:
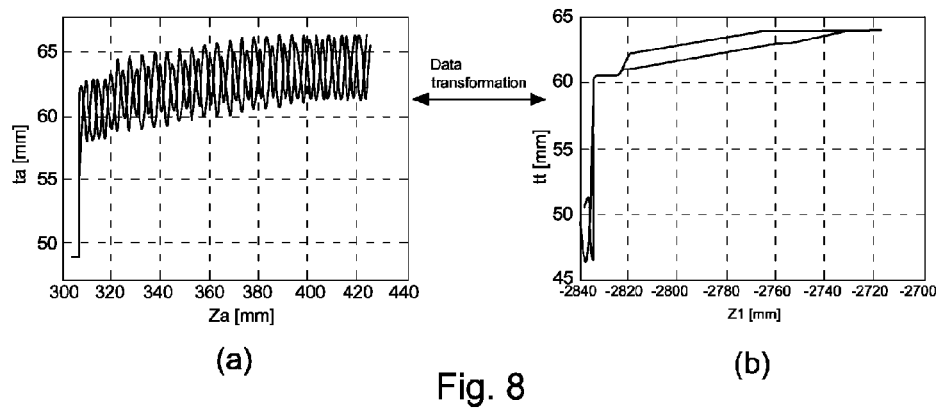

FIG. 8 shows the t vs. Z graphs for the measurement device reference frame, graph (a), as data are acquired and for the thread reference frame, graph (b) transformed using the misalignment estimation calculated from the spiral scans. The graph (a) of FIG. 8 shows on the left what the effects of misalignment are on the acquisition procedure.

Figure 9:
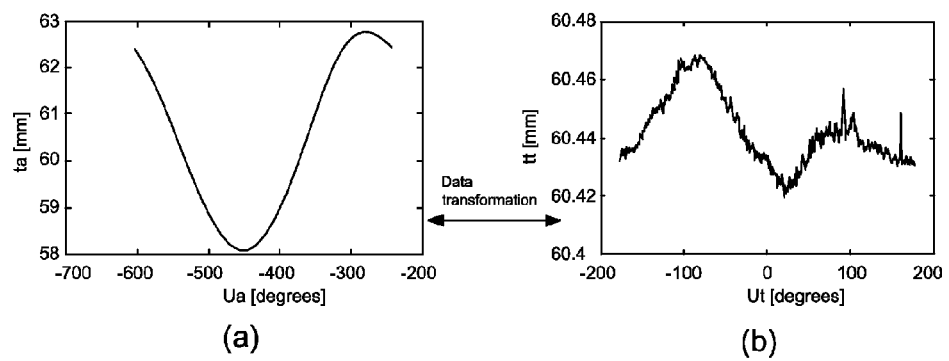

In a specific embodiment of the measurement method a data acquisition procedure provides for scanning the seal of the thread. In this case, an ideal circular trajectory is generated with reference to the thread reference frame at a predetermined distance from the nose and then transformed to the measurement device reference frame for its execution. FIG. 9 shows two graphs containing the results of a typical seal scan, where graph (a) shows the scan expressed in the measurement device reference frame and graph (b) shows the scan in the thread reference frame.

This scanning trajectory must be executed starting at a predefined distance from the pin nose and in alignment with the threaded object because the nose profile may be complex and the radius measured may be highly dependent on the exact position measured. A good estimation of the nose position is calculated when a plurality of scans is made, e.g. six. In this example, the nose position detected on each of the six longitudinal scans is retrieved. These data are then transformed to the thread reference frame and averaged to get a single, more accurate, nose reference.

In another embodiment of the measuring method the phase of the thread with respect to the device reference frame is retrieved from the spiral root scan and a longitudinal trajectory is set in the thread reference frame such that it passes through the measuring points determined in the inspection report for the measurement of the run-in. Similarly, a trajectory is set for the points defined for the measurement of the run-out.

Figure 10:
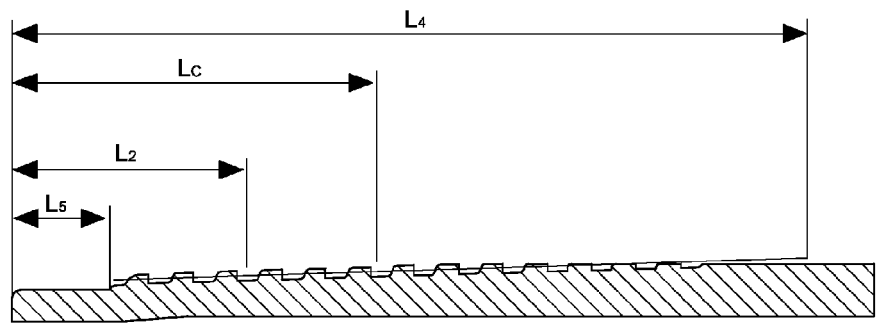
FIG. 10 shows a scheme of the threading on which the method of the invention is used, FIG. 11 are graphs showing results of thread root scans, FIG. 12 are graphs showing results of thread crest scans.

After data acquisition operations are completed, data analysis is performed on the acquired data, but transformed to the thread reference frame, as a final part of the measurement method according to the invention. Unless indicated differently, in the following all data are expressed on the threaded object reference frame. Most of the parameters are indicated in relation to different length references taken on the thread and referenced to the nose position. FIG. 10 shows the three main references used in data analysis that will be referred to below.

L5 is the length to the beginning of the thread;
L2 is the reference length for the thread diameter and ovality calculation;
Lc is the minimum length where the thread parameters must fulfil the tolerances;
L4 is the length to the end of roots and crests, which is lower than the pull-out length where the run-out is measured.

Determination of the taper is one operation of data analysis. The equation that describes the outer surface of the cone thread is the following.

$$t_{thread} = (R_0 - A \cdot Z_{thread}) \quad [2]$$

Where
$t_{thread}$ and $Z_{thread}$ are the radial and azimuth coordinates in the thread frame of reference,
$R_0$ is the primitive radius and
A is the taper of the pin threading.

Figure 11:
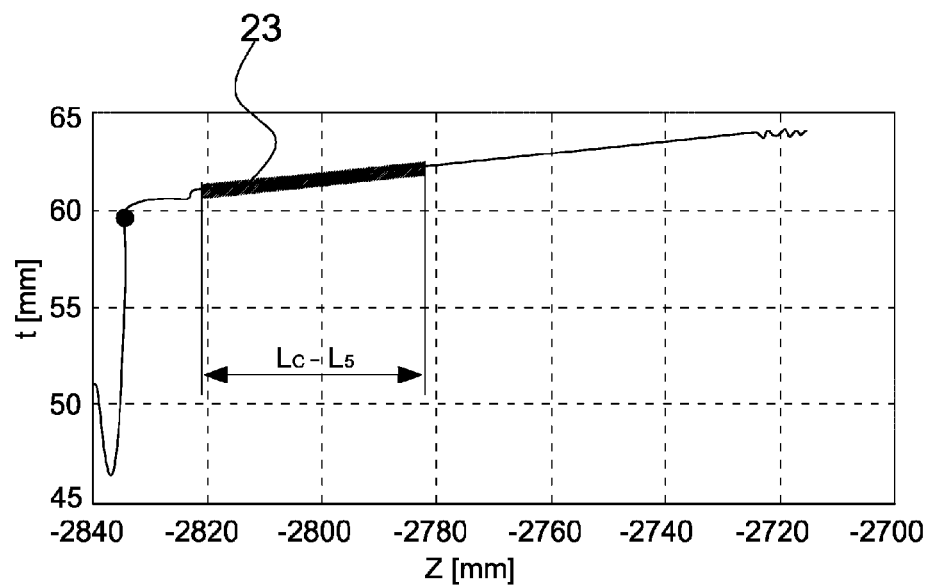

To calculate the taper, the t vs. Z relationship from the root scan of the thread is used. Data acquired previously between L5 and Lc, corresponding to segment 23 of the curve, is analyzed as shown in FIG. 11. A linear fit is performed over these data 23 to calculate the slope, comprising the values of taper and of A. The deviations of the data with respect to that linear fit are calculated. Those deviations contain information regarding the machining process, e.g. the non-compensated forces due to the change in pipe stiffness along the thread object and the over tightening of the pipe on the lathe. This information can be retrieved using a Fourier modal analysis as a function of the thread position. For example a large three-mode means overtightening of the pipe on the lathe, while a parabolic behaviour of the fundamental mode means that the tool was taken before the end of the Lc.

Figure 12:
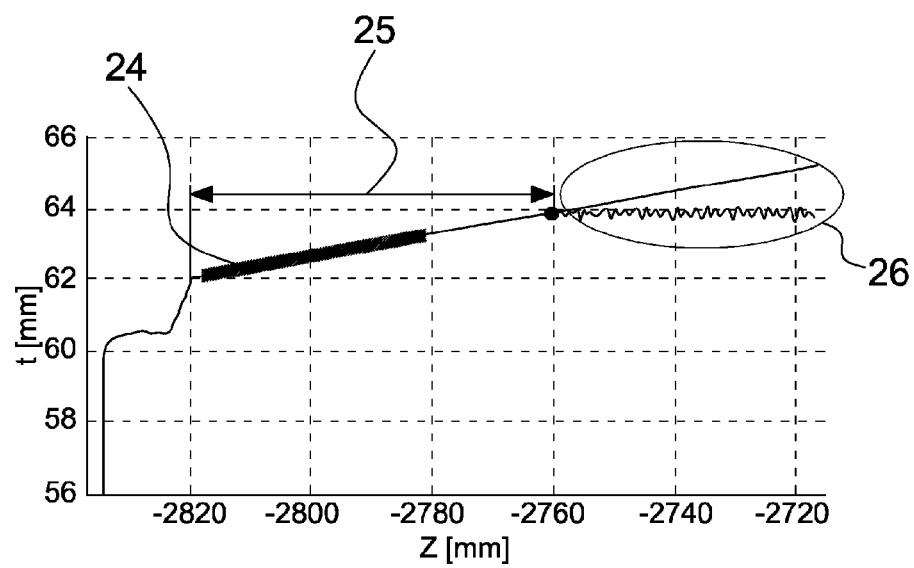

Full thread length, corresponding to the segment 25 of the curve of FIG. 12, is analysed considering the data gathered from the crest scanning. First a linear fit is performed using the acquired, and filtered, data between L5 and Lc, corresponding to segment 24. Deviations of the data with respect to the linear fit are calculated. Subsequently those values over L5 that are more than 0.1 mm greater than this linear fitting are identified, corresponding to segment 26 of the curve in FIG. 12. With these values, a new linear fit (using the Z positions and the errors) is performed and the zero abscissa is calculated. This value is defined as the upper limit for the full thread length as shown in FIG. 12. Further analysis can be done using the non-machined part of the pipe shown in FIG. 12. These values correspond to the virgin pipe and can provide information on the position of the thread with respect to the pipe at the moment of machining the part. For example, if the lathe has the plate misaligned, the thread will be off-axis with respect to the pipe, or if the pipe has a hook end the pipe and thread axis will not be parallel. Those variables can be easily calculated by finding the transformation between the pipe and thread coordinate systems.

Figure 13:
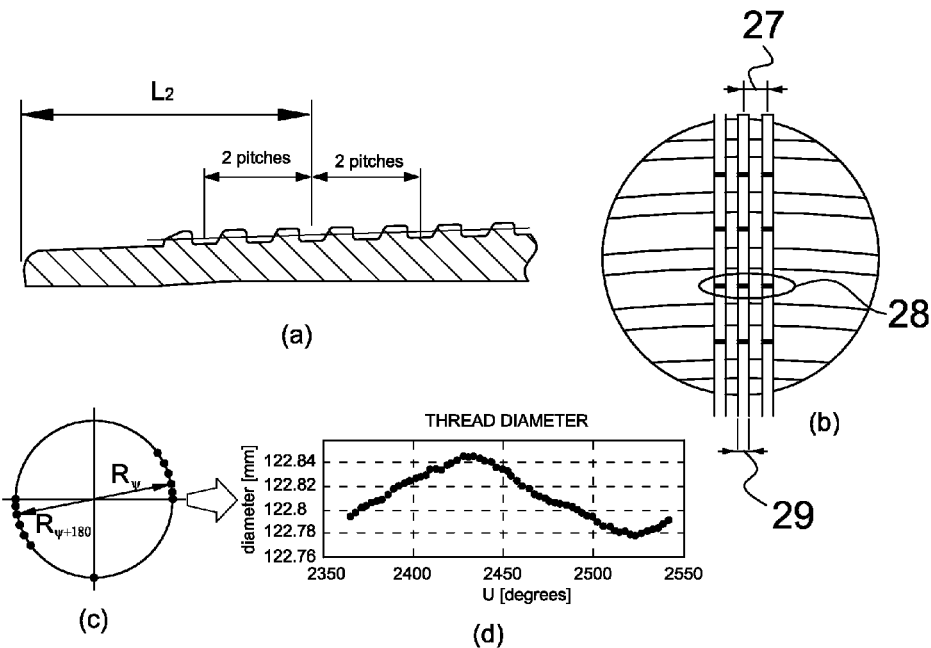
FIG. 13 shows schemes of the threading on which the method of the invention is used, FIG. 14 are graphs showing results of thread run-in scans, FIG. 15 are graphs showing results provided by the measurement method of the invention.

Another data analysis operation relates to calculation of thread diameter and ovality. Thread diameter and ovality are evaluated in two ways using the root spiral scan. The data being analyzed are those comprised in the zone corresponding to L2±2 thread pitches. Root points defined in this zone, cf. FIG. 13 (a) showing the thread lateral view in section, are linearly fitted, after which this fitted linear function is evaluated to obtain the radius.

Alternatively, root points for each radius determination are performed on generatrices equally spaced, advantageously at angular distances 27 of three degrees. On each generatrix, data for each root are averaged considering a generatrix width 29 of typically, but not necessarily, 5 degrees, cf. FIG. 13 (b) showing a thread top view. This implementation is similar to the mill procedure used with the MRP gauge.

Radii of defined points, cf. circle 28 of FIG. 13(b), are calculated for generatrices ranging from 0 to 180 degrees, with steps of 3°, together with the opposite generatrices for diameter calculation as shown in FIG. 13(c), illustrating a thread frontal view. Successively thread diameter and ovality are calculated by the following relationships:

$$\text{Diameter} = (D_{max} + D_{min})/2 \quad [3]$$

$$\text{Ovality} = (D_{max} - D_{min})/2 \quad [4]$$

where $D_{max}$ and $D_{min}$ are the maximum and minimum diameters calculated through this process respectively. The results are shown in the graph 13(d).

Figure 14:
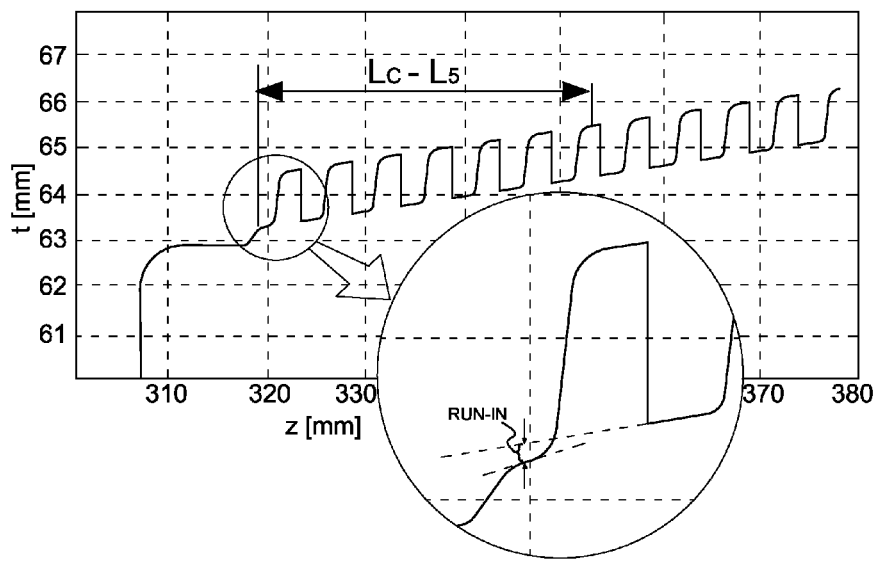

Another operation in the data analysis procedure is run-in evaluation and this is derived from a longitudinal scan done in respect of the thread reference frame. FIG. 14 shows one of these scans which details the region in which the run-in is calculated.

First, a linear fit is performed with unfiltered root data points between L5+pitch and Lc. This fitted line is compared with the root data included in the segment defined by Rv and Rv2 as shown in FIG. 5 and referred to L5. A linear fit is performed over the error array resulting from that comparison. Then, the difference between this fitting, evaluated at the root mid segment value, and the previous fitting is defined as the run-in value.

Subsequently a run-out analysis is carried out in a similar manner to the operation performed for the run-in.

Yet another operation is a pitch determination wherein the load flanks generated from the longitudinal scans are analysed.

The vectors containing the load flank values for each longitudinal scan are truncated so as to keep the flanks between L5+pitch and Lc. Of these flanks just the flanks of type 0 are accepted. The remainder of the types are discarded, being considered unreliable as real load flank identifications.

Figure 15:
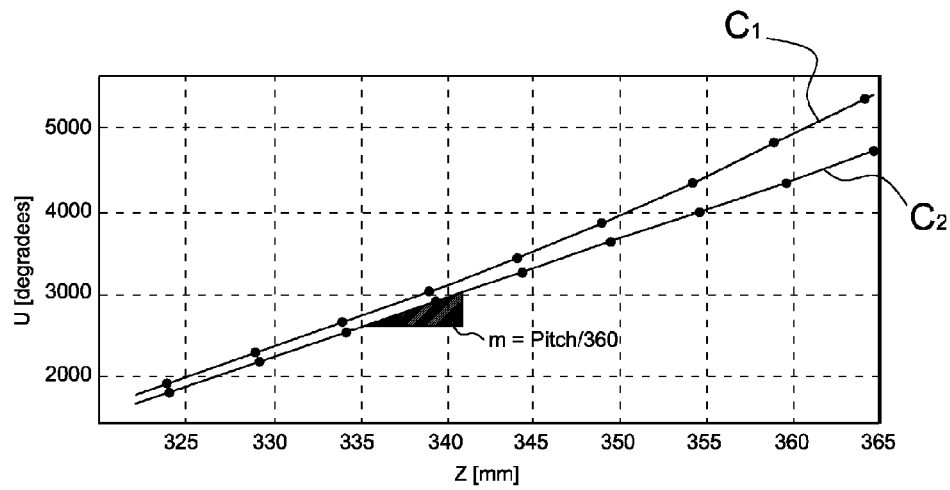

FIG. 15 shows a hypothetical longitudinal scan and the positions of the load flanks identified. The curve $C_1$ is how this would be if expressed in a measurement device reference frame where the effect of misalignment is noticed in the curvature (quadratic form) of the flank position trend, due to "falling-off" of the thread generatrix. This effect is also visible in the increasing separation between flank positions as the Z scan position grows.

To calculate the thread pitch, data must be transformed to the thread reference frame, indicated by $C_2$ in the figure. Data expressed in that frame has a linear trend where flank positions may not be equally spaced but the slope of the linear fit is the thread pitch.

There are two types of pitch that are calculated and obtained by the software:

A first pitch calculated from the slope of the linear fit for all the flanks detected.

A second pitch calculated from the slope of the line formed by two flanks whose separation depends on the thread being analysed (this measurement must be done in relation to the number of threads per inch).

It will be appreciated that the data obtained gives information on the pitch for each longitudinal scan.

The measurement method of the invention is particularly advantageous for measuring threading having a wedge profile, i.e. a profile that has a progressive increase in tooth width and more particularly when the wedge profile is combined to a dove-tail shaped tooth profile in an axial section.

In the case of a wedge thread with a dove-tail tooth profile, the measurement of crests and roots provides for a spiral scan as described above wherein the spiral trajectory follows a line corresponding to the middle position set along the middle distance between the load and stabbing flanks or any other spiral trajectory parallel to said middle position.

In state-of-the-art methods the measuring and controlling of wedge threads provides also that all measurements are taken from a reference point that is conventionally called bolt point. The ball point is defined by passing a bolt, i.e. a measurement element having a small rolling ball of predetermined diameter, along the roots and setting the point where the bolt remains stuck in the root, because the tooth width is variable along the thread. The distance and generatrix at which the bolt point is located with respect to the front of the tube determine the reference point for measuring all parameters of a wedge thread.

According to the measurement method of the invention this operation of setting the bolt point does not need to be performed because the threading parameters are measured from a reference point that is located at the end of the tube. The determination of this point is based on detecting all load and stabbing flanks in the spatial reference system of the measurement device (X, Y, Z) and then express them in the spatial reference system (X', Y', Z') of the pin using the axes transformation matrix to convert all data retrieved from one spatial reference system to the other spatial reference system, as described above.

Once the flanks positions are expressed in the spatial reference system (X', Y', Z') of the pin, a linear fit is performed on the "Zr-Ur" plane where Zr is the axial position of the flank and Ur is the flank generatrix. This linear fitting is performed for all load and stabbing flanks of the threading separately.

Finally, a subtraction is performed between the two lines adjusted, described in the previous paragraph, and obtaining the "root width" for the whole thread and look for the value (Zr–Ur) of "root valley" where the bolt is stuck in the root for a wedge effect.

The measurement method of the invention for a wedge profile includes also a "Higbee" measurement. The Higbee is conventionally defined as the cut of the first incomplete thread adjacent to the bevel made at the nose of the pin where its intersection with the thread load flank makes a sharp edge. The Higbee corresponds to the removal of the incomplete starting thread (of many types of thread, not only wedge) on tube end, with outer diameter OD≥5 in. The Higbee removes the starting thread from where thread height is zero, until the thread crest starts, i.e. until where the thread height reaches the acceptance value, and the intersection between the Higbee and the crest of the thread defines a line, parallel to the taper. The arc length of the Higbee is approximately 180°.

Higbee length and height have to meet fabrication tolerances, and depend on the OD and type of connection. Higbee height can be 0, this is to say that the machining tool can reach the root of the thread.

Figure 17:
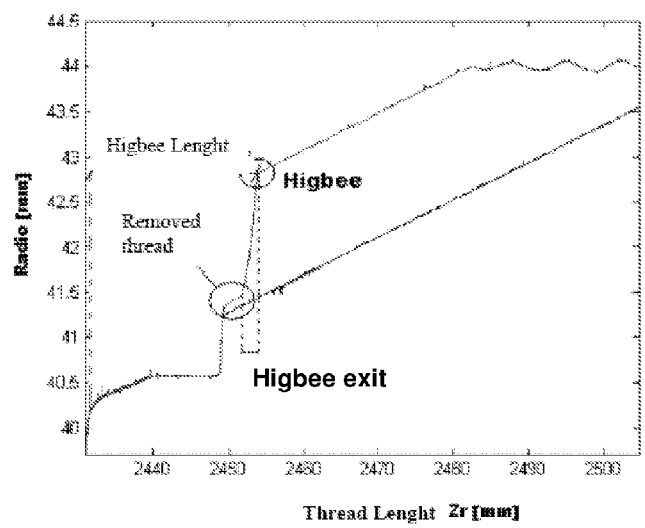
FIG. 17 is a graph showing results of another thread scan.

The Higbee point detection is made by adjusting data retrieved from the spiral scan performed on the crest of threading and fitting it to a line and then eliminating from said line all points that are in an area close to the Higbee, when the error between the fitted line and data is greater than some threshold. This point is shown in the graph of FIG. 17.

The order in which the operations described above are made can vary as well as the number of operations, depending on the necessities and on the parameters to be measured.

The completeness of the measurement operation provides also for a calibration of the measurement device before starting operation of the system after set up.

Figure 16:
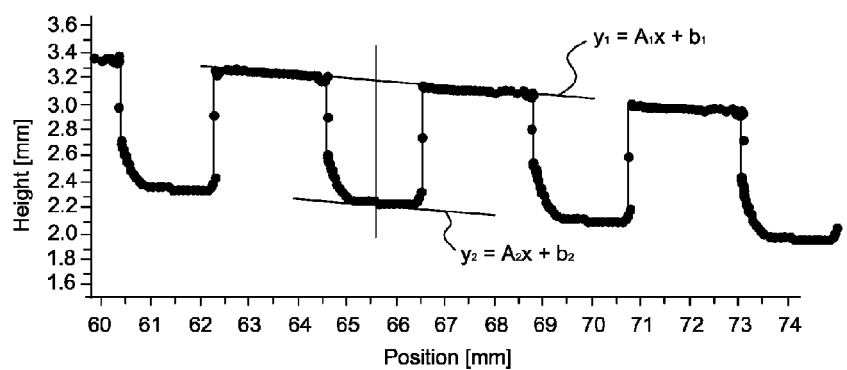
FIG. 16 shows the step height calculation on a thread using linear fitting of crests and roots.

The data points obtained in the longitudinal scan can be further analysed to obtain the value of the step height. Data close to the edges are discarded and a linear fit between consecutive crests is performed, cf. FIG. 16. The fit is compared to the linear fit of the root and its depth is evaluated by calculating the distance between the line y2 at the center of the root. A similar procedure is performed to calculate the height of the crests, taking y1 as the center of the crest. From the depth and height of the roots and crests, the average and standard deviation are calculated, the incomplete steps are identified and the length of the thread estimated.

Yet another way to calculate the step height, in this case in a global manner, is to subtract a linear fit obtained from the crest and root spiral trajectories. This gives the difference between the inner and outer cones that represents the value of the step height.

What is claimed is:

1. A method of measuring thread parameters for a threaded object, wherein a measurement device is provided incorporating one or more optical sensors adapted to retrieve the shape of the threaded object, having a nose and defining a first spatial reference system comprising first co-ordinate axes, the measurement device defining a second spatial reference system comprising second co-ordinate axes, providing a computer for storing a preset algorithm to calculate a first matrix that describes the quadratic form representing the threaded object in the second spatial reference system, thus providing the relationship between the first and second spatial reference systems, the method comprising the steps of:

predefining at least one trajectory of the one or more optical sensors on the threaded object along which one or more predefined measurement points are selected such that the matrix evaluated on these values has a maximum rank;

performing a first scanning operation by the one or more optical sensors along said at least one trajectory and retrieving data of the one or more predefined measurement points;

feeding the data to the preset algorithm and calculating an axes transformation matrix relating the first spatial reference system to the second spatial reference system for defining the relative position of the threaded object with respect to the second spatial reference system; and using the axes transformation matrix to convert all data retrieved from the second spatial reference system to the first spatial reference system.

2. The method of claim 1, wherein the first scanning operation by the one or more optical sensors along said at least one trajectory is used to retrieve data for measuring one or more predefined thread parameters.

3. The method of claim 1, wherein one or more second scanning operations are provided to retrieve data for measuring one or more predefined parameters.

4. The method of claim 2, wherein the at least one trajectory comprises one or more longitudinal scans parallel to a Z axis of the second spatial reference system.

5. The method of claim 3, wherein one or more second scanning operations are performed along one or more helicoidal trajectories.

6. The method of claim 3, wherein during any of the first or second scanning operations the position of one or more thread flanks is retrieved.

7. The method of claim 6, wherein a helicoidal thread lead trajectory passing along middle points of thread crests and/or roots is defined from the position of the one or more thread flanks.

8. The method of claim 7, wherein a scanning operation is performed along the helicoidal thread lead trajectory, the retrieved data being fit to a linear dependence.

9. The method of claim 8, wherein a difference between the retrieved data and the linear dependence is obtained and a Fourier analysis is performed on said difference.

10. The method of claim 8, wherein a difference between the retrieved data and the linear dependence is obtained and is evaluated at initial and final portions.

11. The method of claim 10, wherein a difference between the retrieved data and the linear dependence is obtained and is evaluated at one or more intermediate positions between the initial and final portions.

12. The method of claim 8, wherein an alignment of a non machined part of the threaded object with respect to a machined part is evaluated to find one or more relevant process parameters.

13. The method of claim 1, wherein a circular trajectory is defined along a metal-to-metal seal diameter in the first spatial reference system, and then transformed into the second spatial reference system to be executed by the measurement device.

14. The method of claim 1, wherein a helicoidal trajectory is defined along a metal-to-metal seal diameter in the first spatial reference system, and then transformed into the second spatial reference system to be executed by the measurement device.

15. The method of claim 1, wherein a longitudinal trajectory is defined along a run-in measuring point in the first spatial reference system, and then transformed into the second spatial reference system to be executed by the measurement device.

16. The method of claim 1, wherein a longitudinal trajectory is defined along a run-out measuring point in the first spatial reference system, and then transformed into the second spatial reference system to be executed by the measurement device.

17. The method of claim 1, wherein at least one longitudinal trajectory intersecting several thread flanks is determined, the positions of those flanks being retrieved and their longitudinal position being plotted against their angular position, to obtain a linear fit.

18. The method of claim 1, wherein at least one trajectory intersecting thread is determined, positions of intersecting points are retrieved, positions of crests and roots are defined and a first linear fit using data from two consecutive crests is made, a second linear fit using data on the root between said two consecutive crests being made and the distance between a first line and a second line respectively defined by the first and second linear fit coefficients being calculated at a predefined point.

19. A measurement device for measuring thread parameters of a threaded object defining a first spatial reference system comprising first co-ordinate axes, the measurement device comprising:

one or more computer controlled non-contact laser-based sensors;

a computer controlled precision mechanical moving system on which said one or more sensors is mounted, the mechanical moving system configured to guide the one or more sensors during one or more scanning operations according to one or more scanning patterns, the mechanical moving system defining a second spatial reference system comprising second co-ordinate axes;

a synchronizer configured to synchronize output signals of the one or more sensors with one or more spatial positions of the mechanical moving system, the synchronizer being configured to provide a relationship between the first and second spatial reference systems by calculating a first matrix that describes a quadratic form representing the threaded object in the second spatial reference system; and a computer configured to control the one or more sensors in the one or more scanning operations to produce one or more computer images of a thread shape of a scanned object, to store the one or more images and to analyze the one or more computer images to obtain quantitative information about one or more thread characteristics.

20. The measurement device of claim 19, wherein the thread characteristics comprise one or more of taper, seal diameter, ovality, run in, run out, thread diameter, pitch along multiple generatrices of a tube, and step height.

* * * * *